United States Patent
Nightingale

(10) Patent No.: US 12,142,031 B1
(45) Date of Patent: Nov. 12, 2024

(54) MACHINE-LEARNED MODEL TRAINING FOR SENSOR PARAMETER SETTING OPTIMIZATION

(71) Applicant: Zoox, Inc., Foster City, CA (US)

(72) Inventor: Reed Berney Nightingale, Seattle, WA (US)

(73) Assignee: Zoox, Inc., Foster City, CA (US)

( * ) Notice: Subject to any disclaimer, the term of this patent is extended or adjusted under 35 U.S.C. 154(b) by 189 days.

(21) Appl. No.: 17/900,664

(22) Filed: Aug. 31, 2022

(51) Int. Cl.
G06V 10/776 (2022.01)
G06V 10/40 (2022.01)
H04N 23/617 (2023.01)
H04N 23/80 (2023.01)

(52) U.S. Cl.
CPC .......... G06V 10/776 (2022.01); G06V 10/40 (2022.01); H04N 23/617 (2023.01); H04N 23/80 (2023.01)

(58) Field of Classification Search
None
See application file for complete search history.

(56) References Cited

U.S. PATENT DOCUMENTS

| | | | |
|---|---|---|---|
| 9,612,123 B1 | 4/2017 | Levinson et al. | |
| 9,628,170 B1 | 4/2017 | Rosenband et al. | |
| 9,871,959 B1 | 1/2018 | Hlatky et al. | |
| 10,015,462 B1 | 7/2018 | Quach | |
| 10,332,245 B1 | 6/2019 | Price et al. | |
| 10,363,390 B2 | 7/2019 | Tal | |
| 11,151,447 B1 | 10/2021 | Chen et al. | |
| 12,022,188 B2 * | 6/2024 | Amini | H04N 23/661 |
| 2010/0033132 A1 * | 2/2010 | Nishi | B60L 3/0046 320/136 |
| 2015/0234045 A1 | 8/2015 | Rosenblum et al. | |
| 2016/0140320 A1 | 5/2016 | Moturu et al. | |
| 2016/0266256 A1 | 9/2016 | Allen et al. | |

(Continued)

OTHER PUBLICATIONS

Ganapathy, et al., "Handwritten Character Recognition Using Multiscale Neural Network Training Technique", World Academy of Science, Engineering and Technology, International Journal of Computer and Information Engineering, vol. 2, No. 3, Mar. 2008, pp. 638-643.

(Continued)

Primary Examiner — Frank Johnson
(74) Attorney, Agent, or Firm — Lee & Hayes, P.C.

(57) ABSTRACT

This disclosure describes methods, apparatuses, and systems for training machine-learned models to determine optimal parameter settings associated with a sensor. For example, a system can input training data into a first machine-learned model configured to output an optimized sensor setting associated with a sensor parameter, the training data includes first sensor data and second sensor data. The system can input the training data into a second machine-learned model configured to output a detected feature. The system can determine a difference between the detected feature and a known feature. The system can alter a model configuration parameter used to capture or process the training data to minimize the difference to obtain a trained first or second machine-learned model. The system can further transmit the trained first and second machine-learned models to a vehicle configured to be controlled based on the first and the second machine-learned models.

20 Claims, 6 Drawing Sheets

(56) References Cited

U.S. PATENT DOCUMENTS

| | | |
|---|---|---|
| 2016/0373645 A1 | 12/2016 | Lin et al. |
| 2017/0008521 A1 | 1/2017 | Braunstein et al. |
| 2017/0066459 A1 | 3/2017 | Singh |
| 2017/0115387 A1 | 4/2017 | Luders et al. |
| 2017/0154426 A1 | 6/2017 | Cheng et al. |
| 2017/0206426 A1 | 7/2017 | Schrier et al. |
| 2017/0307735 A1 | 10/2017 | Rohani et al. |
| 2017/0330319 A1 | 11/2017 | Xu et al. |
| 2018/0075643 A1 | 3/2018 | Sequeira et al. |
| 2018/0077538 A1 | 3/2018 | Matus et al. |
| 2018/0089843 A1 | 3/2018 | Miecznik |
| 2018/0217233 A1 | 8/2018 | Lee |
| 2018/0244129 A1 | 8/2018 | Whitens et al. |
| 2018/0299554 A1 | 10/2018 | Van Dyck et al. |
| 2019/0066336 A1* | 2/2019 | Golde ................... G06T 7/90 |
| 2019/0179317 A1* | 6/2019 | England ............... G05D 1/0231 |
| 2020/0282929 A1* | 9/2020 | Kroeger ................. G01S 7/497 |
| 2021/0287548 A1* | 9/2021 | Lai ........................ B60R 1/025 |
| 2022/0172464 A1* | 6/2022 | Ross ....................... G06V 20/10 |
| 2023/0274454 A1* | 8/2023 | Pollard ............. G01B 11/2522 382/154 |
| 2023/0367995 A1* | 11/2023 | Mukhopadhyay ..... G06N 3/047 |

OTHER PUBLICATIONS

Office Action for U.S. Appl. No. 15/457,838, mailed on Jul. 8, 2020, Chen, "Network Training Process for Hardware Definition", 21 pages.

Office Action for U.S. Appl. No. 15/457,838, mailed on Jan. 10, 2020, Chen, "Network Training Process for Hardware Definition", 28 pages.

Office Action for U.S. Appl. No. 15/457,838, mailed on Dec. 15, 2020, Chen, "Network Training Process for Hardware Definition", 23 pages.

Venturelli, et al., "From Depth Data to Head Pose Estimation: a Siamese Approach", retrieved from <<http://www.distraction.gov/index.html>>, arXiv:1703.03624, Mar. 10, 2017, 8 pages.

* cited by examiner

300

| Sensor Modality | Sensor/SP Settings |
|---|---|
| Camera | camera gain |
| | exposure |
| | gamma |
| | brightness |
| | contrast |
| | white balance |
| | hue |
| | camera saturation |
| | high-dynamic range |
| | denoising |
| | sharpening |
| | camera pixel binning |
| | bit depth |
| | area of interest |
| | video rate |
| | color format |
| | debayering mode |
| | distortion correction |
| | vignetting correction |
| | ... |
| Microphone | microphone gain |
| | directionality |
| | ... |
| Lidar | spin rate |
| | spin direction |
| | lidar pulse mode |
| | lidar pulse intensity |
| | ... |
| Time-of-Flight (ToF) | ToF gain |
| | ToF saturation time |
| | ToF pixel binning |
| | modulation frequency |
| | emitter intensity |
| | ... |
| Ultrasonic Range | frequency |
| | pulse mode |
| | pulse intensity |
| | ... |
| Radar | radar frequency |
| | cycle timing |
| | chirp slope |
| | range mode |
| | sensing threshold |
| | ... |

FIG. 3

MACHINE-LEARNED MODEL TRAINING FOR SENSOR PARAMETER SETTING OPTIMIZATION

BACKGROUND

Autonomous vehicles may use a variety of sensors, including cameras, LIDAR, Radar, GPS, etc., to detect objects in an environment and to plan a vehicle trajectory within the environment. For each sensor, there are different parameter settings, such as gain, brightness, exposure, etc., which engineers and users can manually set to adjust the way that the sensors capture data and/or the way that the data is processed. Though certain settings of those parameters may more "accurately" represent the environment based on human perceptibility of the output data, human perceptibility of the output data may not be the best way to represent the data to improve performance of the vehicle. Additionally, the appropriate parameter settings for one set of circumstances may not be the same as for other circumstances. In such cases, the data collected may be suboptimal, potentially degrading object detection and avoidance, vehicle navigation, and other vehicle functions that rely on the sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 illustrates an example sensor parameter table for one or more sensor modalities, as described herein.

DETAILED DESCRIPTION

Figure 1:
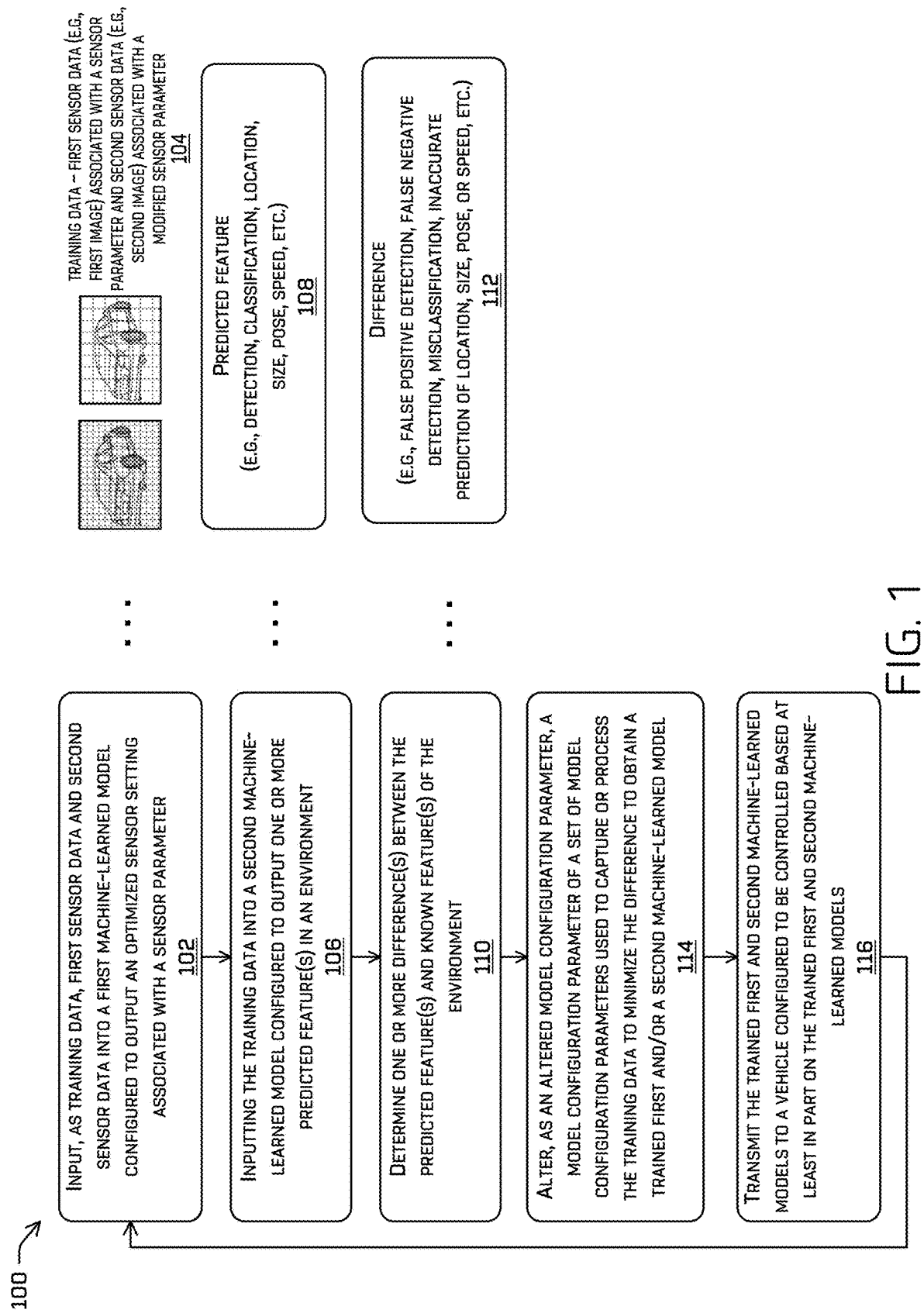
FIG. 1 illustrates a pictorial flow diagram of a process for implementing machine-learned model training for determining sensor parameter settings for one or more sensors and/or sensor data processing pipelines.

Computing devices and techniques according to this disclosure may train a machine-learned model to determine sensor parameter settings for one or more sensors and/or dynamically adjust one or more sensor parameter settings of the one or more sensors during vehicle operation. Such sensors may include, but are not limited to, an image sensor, a microphone, a lidar sensor, a time-of-flight (ToF) sensor, an ultrasonic range sensor, a radar sensor, and the like.

As discussed above, sensor parameters that are set to more "accurately" represent the environment based on human perceptibility of the output data may not be the best way to represent the data to improve performance of the vehicle. This disclosure describes techniques to adjust sensor parameter settings (e.g., sensor settings and/or signal processing settings) based on performance of a perception system of the vehicle to improve the performance of the perception system. The disclosure also describes techniques for dynamically adjusting sensor parameter settings during operation of the vehicle. For instance, in some examples, the sensor parameter settings may be adjusted periodically during operation, upon occurrence of an event, and/or in response to changed environmental conditions, in order to optimize performance of the perception system over time and/or during changing operational conditions.

In some examples, a system may input training data into a first machine-learned model configured to output an optimized sensor setting. The training data may include first sensor data received from a sensor associated with a sensor parameter, where the first sensor data represents an environment. The training data can further include second sensor data received from the sensor associated with a modified sensor parameter.

The system may input the training data into a second machine-learned model configured to output a detected feature in the environment. The system may further determine a difference between the detected feature and a known feature of the environment. Examples of a known feature may include, but are not limited to, a known presence of the object in the sensor data, a known classification of the object, a known location associated with the object, a known object size, a known pose of the object, a known speed of the object, a known direction of motion of the object, etc. Examples of a detected feature may include, but are not limited to, a detection of the object, a classification of the object, a location associated with the object, an object size, a pose of the object, a speed of the object, a direction of motion of the object, etc. Examples of a difference between the detected feature and the known feature may include one more of a false positive detection of the object, a false negative detection of the object, a misclassification of the object, or an inaccurate detection of location, size, pose, speed, direction of motion of the object, etc.

The system may alter a model configuration parameter of the set of model configuration parameters used to capture or process the training data to minimize the difference to obtain a train first machine-learned model and/or a trained second machine-learned model.

In some instances, the methods described herein can be used to compare the performance of two hardware sensors. For example, in the context of cameras, a first camera with a first resolution (or a first set of parameters) can be used to generate a first set of images, which can be labeled to generate the first sensor data. Similarly, a second camera with a second resolution (or second set of parameters) can be used to generate a second set of images, which can be labeled to generate the second sensor data. In at least some such examples, the first and second cameras may be the same camera having differing parameters. The first sensor data and the second sensor data can be used to train the first machine-learned model and/or the second machine-learned model to obtain a trained first machine-learned model and/or a trained second machine-learned model.

Any number of sensors and any type of sensors may be determined in combination to improve performance of a particular sensor suite. Example autonomous vehicles may include multiple cameras, microphones, lidar sensors, time-of-flight sensors, ultrasonic range sensors, radar sensors, and/or other sensors disposed in or on various portions of the vehicle. Different sensors of a same sensor type or modality on different portions of the vehicle may have different sensor parameter settings. For instance, an example autonomous vehicle may have, among other sensors, a camera disposed at each corner of the vehicle. In some examples, parameters of a first camera at a first corner of the vehicle may be set differently than parameters of a second camera disposed at a second corner of the vehicle different than the first corner. By way of example and not limitation, the second corner may be diagonally opposite the first corner, may be on a same lateral side of the vehicle and an opposite longitudinal end of the vehicle as the first corner, or may be on a same longitudinal end of the vehicle and an opposite lateral side of the vehicle as the first corner. Similarly, the parameter settings of individual lidar sensors, time-of-flight sensors, ultrasonic range sensors, radar sensors, may be set differently than other individual sensors of the same type/modality at any given time. Additionally, the parameter settings of any or all of the individual sensors may be varied periodically over time to prevent or account for the system optimizing the parameter settings around a local optimal setting (e.g., a local maxima or local minima). Thus, the methods described herein may be used to alter various parameters of sensor suits, which helps to optimize sensor capture and/or processing settings and improves sensor suite's performance in capturing and/or processing sensor data.

In some examples, a system may receive, from a sensor associated with a vehicle, first sensor data representing a portion of an environment, where the first sensor data may be generated using a first setting of a parameter. The parameter is associated with at least one of an individual sensor used to capture the first sensor data or a signal processing algorithm used to process an output of the sensor to generate the first sensor data. The system may input the first sensor data into a first machine-learned model trained to detect one or more features in the environment. The first machine-learned model may determine a first feature in the environment.

In some examples, the system may further input the first sensor data into a second machine-learned model trained to output an optimized sensor setting (e.g., a second setting of the parameter). The system may modify the sensor in accordance with the second setting of the parameter, and receive, from the sensor, second sensor data representing the portion of the environment generated using the second setting of the parameter.

In some examples, the system may input the second sensor data into the first machine-learned model to determine a second feature in the environment. Examples of a feature may include, but are not limited to, a detection of the object, a classification of the object, a location associated with the object, a size associated with the object, a pose associated with the object, a speed of the object, a direction of motion of the object, etc.

The system may receive, from the first machine-learned model, a first confidence value associated with first feature and a second confidence value associated with the second feature. The system may further determine whether the second confidence value is greater than or equal to the first confidence value. If the second confidence value is greater than or equal to the first confidence value, the system may control the vehicle based at least in part on the second feature. If the second confidence value is less than the first confidence value, the system may control the vehicle based at least in part on the first confidence value.

The systems and methods described herein can improve a functioning of a computing device in a number of ways. In some examples, by training a machine-learned model, techniques described herein can generate a calibration function, e.g., that reduces or minimizes errors in subsequent processes associated with an autonomous vehicle (e.g., classification, tracking, prediction, route planning, trajectory generation, and the like). For example, the calibration function generated according to techniques described herein may be used to determine one or more parameter settings of the sensors and/or signal processing algorithms for use in the autonomous vehicle. Optimized sensors and signal processing algorithms incorporated into an autonomous vehicle can increase an accuracy of position detection and/or trajectory mapping for directing the autonomous vehicle. Furthermore, by adjusting sensor parameter settings periodically during operation, upon occurrence of an event, and/or in response to changed environmental conditions, techniques described herein can optimize performance of the perception system over time and/or during changing operational conditions. Sensors and/or sensor suites calibrated as described herein may increase a level of safety for passengers of the vehicle by more accurately identifying obstacles or dangerous situations. These and other improvements to the functioning of the computer are discussed herein The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems (e.g., a sensor system, a robotic platform, manually driven vehicles, etc.) requiring calibration of sensors prior to and/or during use, and are not limited to autonomous vehicles. In one example, similar techniques may be utilized in driver-controlled vehicles in which such a system may provide an indication of whether it is safe to perform various maneuvers. In other examples, the methods, apparatuses, and systems may be utilized to calibrate sensors on airborne, water-borne, and/or robotic devices that include multiple sensors. Additionally, the techniques described herein can be used with real data (e.g., captured using sensor(s)), simulated data (e.g., generated by a simulator), or any combination of the two.

FIG. 1 illustrates a pictorial flow diagram of a process 100 for implementing machine-learned model training for determining sensor parameter settings for one or more sensors and/or sensor data processing pipelines.

At operation 102, the process 100 can include inputting, as training data 104, first sensor data and second sensor data into a first machine-learned model configured to output an optimized sensor setting associated with a sensor parameter. The first sensor data can be received from a sensor associated with a sensor parameter, and the first sensor data can represent an environment. The second sensor data can be received from the same sensor associated with a modified sensor parameter. Such sensors can include, but are not limited to, an image sensor, a microphone, a lidar sensor, a time-of-flight (ToF) sensor, an ultrasonic range sensor, a radar sensor, and the like. For example, the first sensor data can include one or more image(s) captured using a camera with a first level of camera pixel binning, and the second sensor data can include one or more image(s) captured using the same camera with a second level of camera pixel binning. In some examples, possible modifications to a sensor parameter can further include modifying a camera gain setting, an exposure setting, a gamma setting, a brightness setting, a contrast setting, a white balance setting, a hue setting, a camera saturation setting, a high-dynamic range setting, a denoising setting, a sharpening setting, a bit depth setting, an area of interest setting, a video rate setting, a color format setting, a debayering mode setting, a distortion correction setting, a vignetting correction setting, etc. Additional modifications to one or more parameters associated with other types of sensors are discussed below in connection with FIG. 3, for example.

In some examples, the first training data 104 can include real data obtained from a sensor associated with an autonomous vehicle during vehicle operation. In some examples, the first training data 104 may be generated based on previously generated and stored log data captured during previous operation of the autonomous vehicle. For example, the log data may include a record of the sensor data, outputs of a perception system of the vehicle (e.g., object detections, classifications, etc.), and actions performed by the vehicle in response to perception data during previous operations of the autonomous vehicle.

In some examples, the operation 102 can include receive raw sensor data from the sensor and modify, as the first sensor data, the raw sensor data in accordance with a signal processing setting. The operation 102 can further include modify, as the second sensor data, the raw sensor data in accordance with a modified signal processing setting.

In some examples, the first training data 104 can include the first sensor data and/or the second sensor data labeled with one or more known feature(s) in an environment. The operation 102 can include labeling at least a portion of the first sensor data and/or the second sensor data to identify the one or more known feature(s) in the environment. In some examples, the one or more known feature(s) includes one or more known feature(s) associated with an object. Example objects can include, but are not limited to, a vehicle, a pedestrian, a roadway, a road sign, a building, etc. Examples of a known feature of the object can include, but are not limited to, a known presence of the object, a known classification of the object, a known location associated with the object, a known object size, a known pose of the object, a known speed of the object, a known direction of motion of the object, etc. In some instances, the labeling can be performed by hand or automatically by a machine-learned model configured to identify known feature(s) associated with the object.

At operation 106, the process 100 can include inputting the training data into a second machine-learned model configured to output one or more detected feature(s) in the environment. For example, the one or more of detected feature(s) can include one or more detected feature(s) 108 of the object represented in the sensor data. Examples of a detected feature of the object can include, but are not limited to, a detection of the object, a classification of the object, a location associated with the object, an object size, a pose of the object, a speed of the object, a direction of motion of the object, etc.

At operation 110, the process 100 can include determining one or more difference(s) 112 between the detected feature(s) and the known feature(s) in the environment. For example, the difference(s) 112 can be determined based on the detected feature(s) 108 and the known feature(s). In some examples, the difference(s) 112 between the detected feature(s) 108 and the known feature(s) can include one more of a false positive detection of the object, a false negative detection of the object, a misclassification of the object, or an inaccurate detection of location, size, pose, speed, or direction of motion of the object, etc.

At operation 114, the process 100 can include altering, as an altered model configuration parameter, a model configuration parameter of a set of model configuration parameters used to capture or process the training data 104 to minimize the difference(s) 112 between the detected feature(s) and the known feature(s) to obtain a trained first train machine-learned model and/or a second trained machine-learned model.

At operation 116, the process 100 can include transmitting the trained first machine-learned model and/or the trained second machine-learned model to a vehicle configured to be controlled based at least in part on the trained first machine-learned model and/or the trained second machine-learned model.

As described herein, an exemplary machine-learned model can utilize a neural network that passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning can be used consistently with this disclosure. For example, machine learning techniques can include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Figure 2:
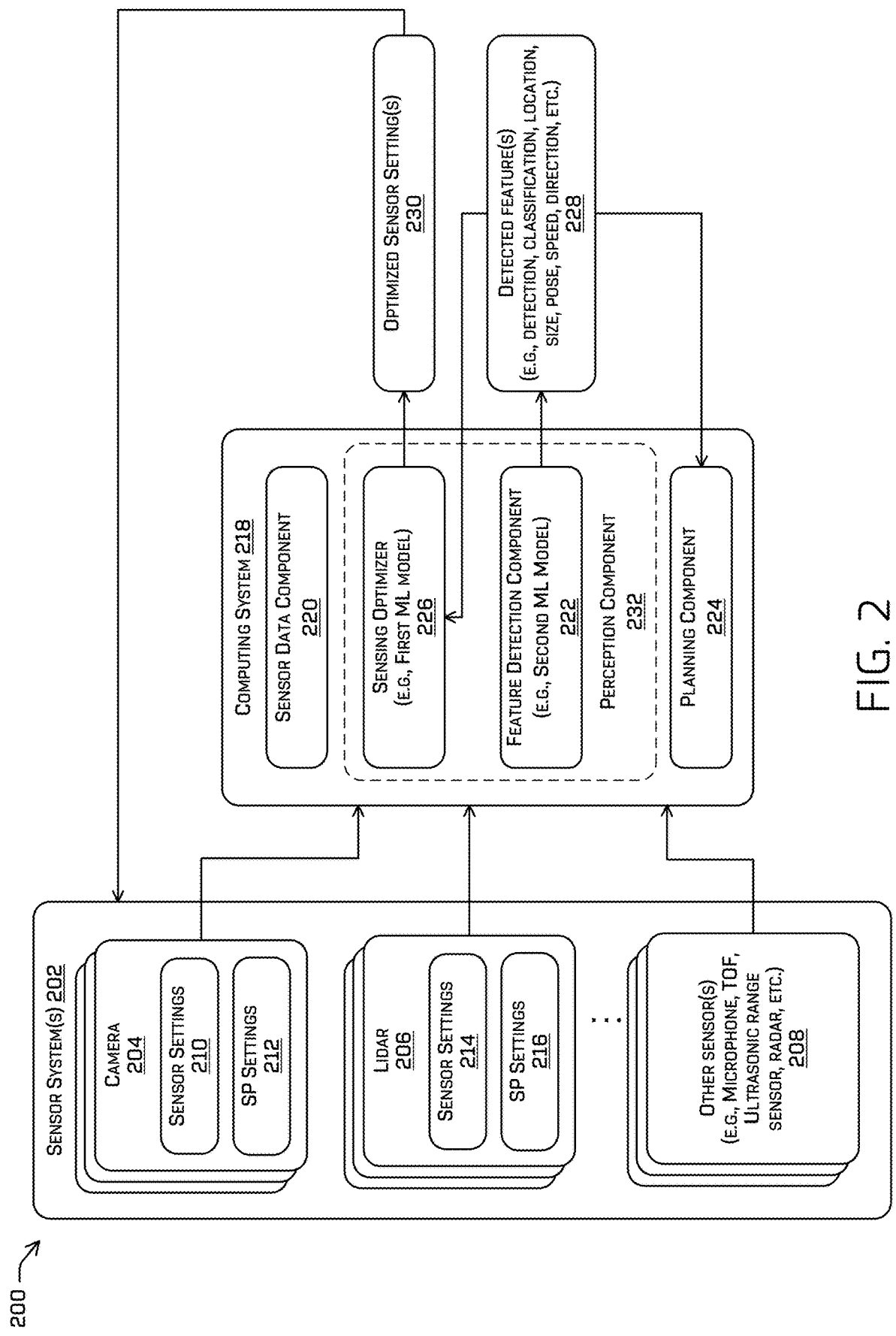
FIG. 2 illustrates an example architecture for implementing the machine-learned model training processes for determining sensor parameter settings for one or more sensors, as described herein.

FIG. 2 illustrates an example architecture 200 for implementing the machine-learned model training processes for determining sensor parameter settings for one or more sensors, as described herein. For example, the architecture 200 can include one or more sensor system(s) 202. The sensor system(s) 202 can include one or more camera sensor(s) 204, one or more lidar sensor(s) 206, and one or more additional sensor(s) 208. Examples of the additional sensor(s) 208 can include, but are not limited to, microphone sensors, ToF sensors, ultrasonic range sensors, radar sensors, etc. Each instance of the camera sensor(s) 204 can include one or more sensor settings 210 and one or more signal processing (SP) settings 212, while each instance of the lidar sensor(s) 206 can include one or more sensor settings 214 and one or more SP settings 216. The one or more camera sensor(s) 204, the one or more lidar sensor(s) 206, and the one or more additional sensor(s) 208 can provide sensor data to one or more computing system(s) 218.

The computing system(s) 218 can include various hardware and/or software to implement aspects of the systems, methods, and apparatuses described herein. For example, the computing system(s) 218 can include a sensor data component 220, a perception component 232, a planning component 224, and a sensing optimizer 226.

Turning to the camera sensor(s) 204, the camera sensor(s) 204 can include any color cameras (e.g., RGB), monochrome cameras, infrared (IR) cameras, depth-cameras, ultraviolet (UV) cameras, etc. As noted above, each one of the camera sensor(s) 204 can include sensor settings 210 and SP settings 212. Sensor settings 210 can include various sensor parameters associated with a camera, such as a camera gain setting, an exposure setting, a brightness setting, a contrast setting, etc. As may be understood in the context of this disclosure, the computing system(s) 218 can receive, from the camera sensor(s) 204 associated with a sensor parameter, first sensor data (e.g., image data, video data, etc.) representing an environment. The computing system(s) 218 can further determine or receive second sensor data, from the camera sensor(s) 204 associated with a modified sensor parameter. For example, the computing system(s) 218 can receive one or more image(s) captured using the camera sensor(s) 204 with a first brightness setting and one or more image(s) captured using the camera sensor(s) 204 with a second brightness setting.

Signal processing settings 212 can include various parameter settings associated with processing raw data obtained from the camera sensor(s) 204, such as a denoising setting, a distortion correction setting, a vignetting correction setting, etc. In some examples, receiving the first sensor data can include receiving raw sensor data and modifying, as the first sensor data, the raw sensor data in accordance with a signal processing setting. Determining or receiving the second sensor data can include modifying, as the second sensor data, the raw data in accordance with a modified signal processing setting. For example, raw data obtained from the camera sensor(s) 204 can be processed using a first denoising setting to generate the first sensor data, and the raw data can be processed using a second denoising setting to generate the second sensor data.

The lidar sensor(s) 206 can also include sensor settings 214 and SP settings 216. For example, sensor settings 214 can include, but are not limited to a spin rate setting, a spin direction setting, a lidar pulse mode setting, or a lidar pulse intensity setting, etc. As may be understood in the context of this disclosure, the computing system(s) 218 can receive, from the lidar sensor(s) 206 associated with a sensor parameter, first sensor data representing an environment. The computing system(s) 218 can further determine or receive second sensor data, from the lidar sensor(s) 206 associated with a modified sensor parameter. For example, the computing system(s) 218 can receive one or more lidar image(s) captured using the lidar sensor(s) 206 with a first spin rate setting and one or more image(s) captured using the lidar sensor(s) 206 with a second spin rate setting.

SP settings 216 can include various parameter settings associated with a signal processing algorithm for processing first sensor data obtained from the lidar sensor(s) 206, such as a splitting setting, a rendering setting, a filtering setting, etc. In some examples, receiving the first sensor data can include receiving raw sensor data and modifying, as the first sensor data, the raw sensor data in accordance with a signal processing setting. For example, raw sensor data obtained from the lidar sensor(s) 206 can be processed using a first filtering setting to generate the first sensor data. Determining or receiving the second sensor data can include modifying, as the second sensor data, the raw data in accordance with modified signal processing setting. For example, raw data obtained from the camera sensor(s) 204 can be processed using a second filtering setting to generate the second sensor data.

The one or more additional sensor(s) 208 can include any sensors suitable for use in an autonomous vehicle, for example. Various sensors can include, but are not limited to, microphone sensors, ToF sensors, ultrasonic range sensors, radar sensors, sonar sensors, inertial measurement unit (EIU), accelerometers, gyroscopes, magnetometers, encoders, temperature sensors, humidity sensors, light sensors, global positioning system (GPS) sensors, etc. As may be understood, the one or more additional sensor(s) 208 can include sensor settings and signal processing settings. For example, sensor settings of a ToF sensor can include, but are not limited to a ToF gain setting, a ToF saturation time setting, a ToF pixel binning setting, a modulation frequency setting, and an emitter intensity setting, etc. Additional sensor settings and/or signal processing settings associated with the one or more sensor(s) 204-208 are discussed below in connection with FIG. 3, for example.

The sensor data component 220 can include sensor data received from one or more sensors. For example, the sensor data component 220 can receive image data from the camera sensor(s) 204, lidar image data from the lidar sensor(s) 206, and/or additional sensor data from the additional sensor(s) 208 (e.g., sensor data from microphones, ToF sensors, ultrasonic range sensors, or radar sensors), and can store sensor data in the sensor data component 220. In some instances, the sensor data component 220 can include functionality to automatically label the stored sensor data with one or more known feature(s) in an environment. For example, the sensor data component 220 can automatically label image(s) with known feature(s) associated with an object. Example objects can include, but are not limited to, a vehicle, a pedestrian, a roadway, a road sign, a building, etc. Examples of a known feature of an object can include, but are not limited to, a known presence of the object in the sensor data, a known classification of the object, a known location associated with the object, a known object size, a known pose of the object, a known speed of the object, a known direction of motion of the object, etc. In some examples, the one or more known features of the one or more objects can be manually provided by a user, and the sensor data can be manually labeled.

As described above, the sensor data component 220 can receive, from a sensor associated with a sensor parameter, first sensor data representing an environment. The sensor data component 220 can receive second sensor data based at least in part on a modified sensor parameter. In some examples, the sensor data component 220 can store the first sensor data and the second sensor data as training data and the sensor data component 220 can transmit the training data to the perception component 232.

The perception component 232 can include a sensing optimizer 226 and a feature detection component 222. In some examples, sensing optimizer 226 can include a first machine-learned model configured to receive the training data from the sensor data component 220 and output an optimized sensor setting associated with the sensor parameter. The feature detection component 222 can include a second machine-learned model configured to receive the training data from the sensor data component 220 and output one or more detected feature(s) 228 in the environment. In various examples, the first and/or second machine-learned model(s) can be implemented as neural network(s), convolution neural network(s), or recurrent neural network(s). Although discussed in the context of neural networks, any type of machine learning can be used consistent with this disclosure. Examples of machine learning algorithms are discussed above in connection with FIG. 1.

In some examples, the feature detection component 222 can determine, based on the training data, one or more detected feature(s) 228. In some examples, the detected feature(s) 228 can include, but are not limited to, a detection of the object, a classification of the object, a location associated with the object, an object size, a pose of the object, a speed of the object, a direction of motion of the object, etc.

In some examples, the feature detection component 222 can further determine one or more difference(s) between the detected feature(s) and the known feature(s). For example, the difference(s) between the detected feature(s) and the known feature(s) can include one more of a false positive detection of the object, a false negative detection of the object, a misclassification of the object, or an inaccurate detection of location, size, pose, speed, or direction of motion of the object, etc.

The sensing optimizer 226 can receive the detected feature(s) from the feature detection component 222 and alter a model configuration parameter of a set of model configuration parameters used to capture or process the training data to minimize the difference(s) to obtain a trained first machine-learned model and/or a trained second machine-learned model. In some examples, the set of model configuration parameters can include model configuration parameters associated with capturing the first sensor data (e.g., model configuration parameters associated with sensor settings 210 or sensor settings 214) and/or model configuration parameters associated with a signal processing algorithm used to process raw data to generate the first sensor data (e.g., model configuration parameters associated with SP settings 212 or SP settings 216). In some examples, the sensing optimizer 226 can be a stand-alone component. Alternatively, the sensing optimizer 226 can be integrated with the feature detection component 222. By altering the model configuration parameter of the set of model configuration parameters used to capture or process the training data to minimize the difference(s) obtain a trained first machine-learned model and/or a trained second machine-learned model, the sensing optimizer can optimize performance of the perception component 232 to improve accuracy, precision, and/or reduce errors.

In some examples, the trained first machine-learned model (e.g., the sensing optimizer 226) can receive sensor data obtained from the camera sensor(s) 204 and output an optimized sensor setting for capturing and/or processing the sensor data. In some examples, outputting an optimized sensor setting for capturing and/or processing the sensor data include altering one or more of a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, a vignetting correction setting, etc. Additional modifications to one or more sensor settings associated with other types of sensors are discussed below in connection with FIG. 3, for example.

In some examples, optimizing the sensor setting for capturing and/or processing the sensor data is based at least in part on determining a first feature in the environment. For example, the optimized sensor setting can be determined based on an occurrence of an event or condition (e.g., detection of a particular type of object, a particular lighting condition, a presence of obstructions, etc.). In some instances, the sensing optimizer 226 can determine a first feature (e.g., one or more feature(s) 228) represented in a first sensor data (e.g., image data obtained from the camera sensor(s) 204) and a confidence value associated with the first feature. The sensing optimizer 226 can further determine a second setting of the parameter based at least in part on the first confidence value is below a threshold confidence value.

In some examples, the optimized sensor setting is based at least in part on a time at which the sensor data was captured. For example, the optimized sensor setting can be updated periodically during vehicle operation, such as updating the optimized sensor setting one time per minute, five times per minute, ten times per minute, etc. In some examples, the optimized sensor setting can be updated at certain times of a day. Furthermore, in some examples, the optimized sensor setting can be set back to default one cycle out of a pre-defined number of cycles, such as updating the setting of the parameter back to a default setting one cycle out of every ten cycles, every fifty cycles, every hundred cycles, etc. By updating the optimized sensor setting periodically over time, the techniques described herein can prevent or account for the sensing optimizer 226 to optimize the optimized sensor setting around an optimal local setting (e.g., a local maxima or local minima).

The sensing optimizer 226 can further output the optimized sensor setting for use in generating sensor data. For example, the sensor system(s) 202 can receive the one or more the optimized sensor setting(s) 230 from the sensing optimizer 226 and generate second sensor data representing the portion of the environment generated using the optimized sensor setting 230. In some examples, the second sensor data is associated with a same sensor as the first sensor data. In some examples, the first sensor data is associated with a first sensor, and the second sensor data is associated with a second sensor different than the first sensor data. The second sensor data can further be sent to the feature detection component 222 to generate a second feature in the environment.

In some examples, the planning component 224 can receive the determined first feature and/or the second feature in the environment from the feature detection component 222 and determine a path for an autonomous vehicle to follow to traverse through an environment. For example, the first feature and/or the second feature can be associated with an object (e.g., the feature(s) 228 associated with the object), and the planning component 224 can determine a route to travel from a first location (e.g., a current location) to a second location (e.g., a target location) to avoid the object in the environment.

In some examples, the computing system(s) 218 can include an in-vehicle computing system running on an autonomous vehicle to perform perception functions and planning functions. Alternatively, in some examples, the computing system(s) 218 can include a remote computing system, and the sensing optimizer 226 can be trained offline. Additional details of the computing system(s) 218 are provided below in connection with FIG. 6. By using the sensing optimizer 226 to adjust sensor parameters of sensors associated with the autonomous vehicle, the techniques described optimize the performance of the perception system 222 and the planning component 224 and increase a level of safety for passengers of the autonomous vehicle by more accurately identifying obstacles or dangerous situations.

FIG. 3 illustrates an example sensor parameter table 300 for one or more sensor modalities, as described herein.

In an example directed to determining optimized sensor settings associated with a camera sensor, the sensor settings can include one or more of a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, a vignetting correction setting, etc.

In an example directed to determining optimized sensor settings associated with a microphone sensor, the sensor settings can include one or more of a microphone gain setting, a directionality setting, etc.

In an example directed to determining optimized sensor settings associated with a lidar sensor, the sensor settings can include one or more of a spin rate setting, a spin direction setting, a lidar pulse mode setting, a lidar pulse intensity setting, etc.

In an example directed to determining optimized sensor settings associated with a ToF sensor, the sensor settings can include one or more of a ToF gain setting, a ToF saturation time setting, a ToF pixel binning setting, a modulation frequency setting, an emitter intensity setting, etc.

In an example directed to determining optimized sensor settings associated with of an ultrasonic range sensor, the sensor settings can include one or more of a frequency setting, a pulse mode setting, a pulse intensity setting, etc.

In an example directed to determining optimized sensor settings associated with of a radar sensor, the sensor settings can include one or more of a radar frequency setting, a cycle timing setting, a chirp slope setting, a range mode setting, a sensing threshold setting, etc.

Figure 4:
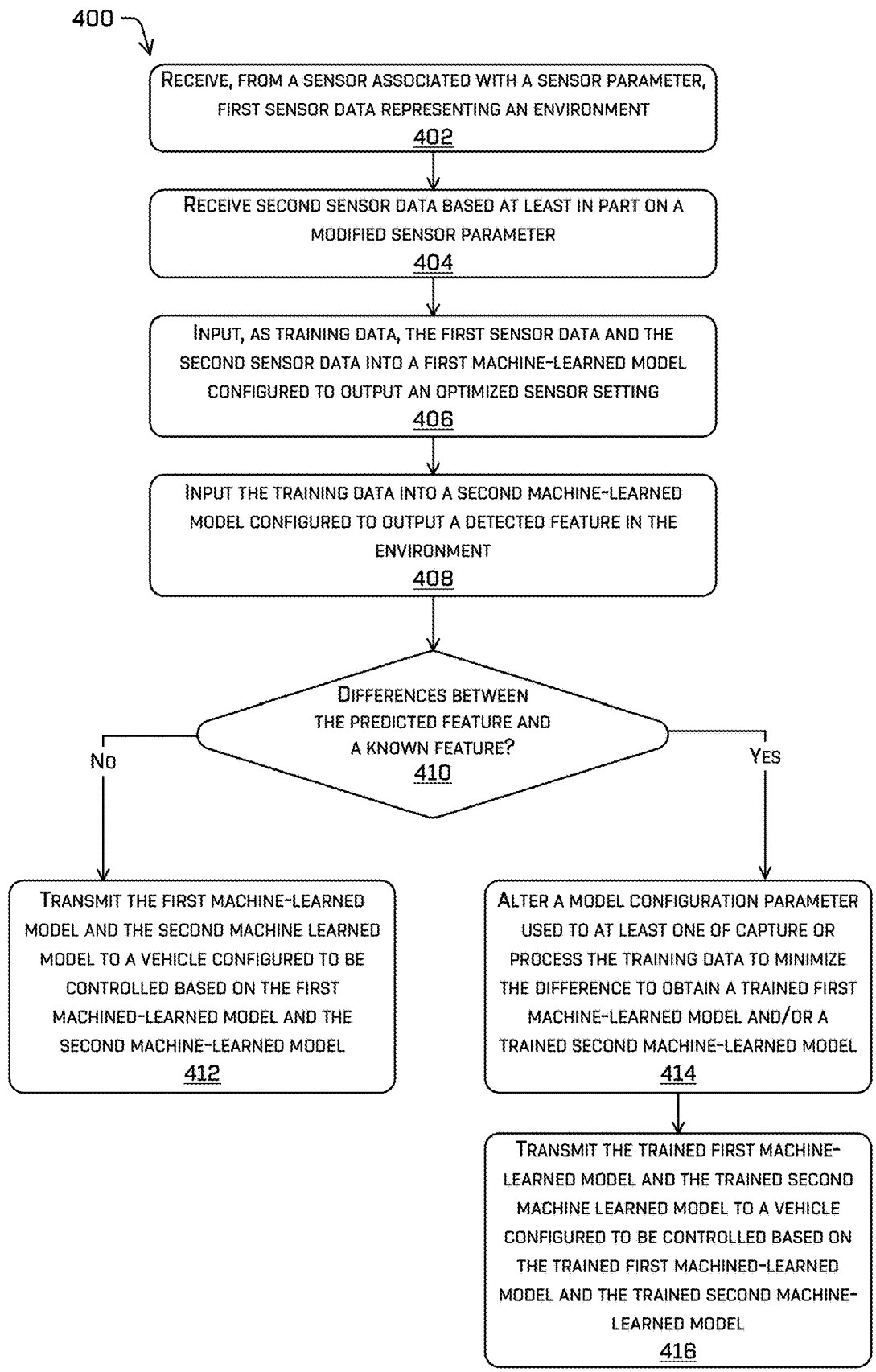
FIG. 4 depicts an example process for training a machine-learned model to determine sensor parameter settings for one or more sensors.

FIG. 4 depicts a process 400 for training a machine-learned model to determine optimized sensor parameter settings for one or more sensors. For example, some or all of the process 400 can be performed by one or more components in the architecture 200, or in the computing system 600, as described below.

At operation 402, the process 400 can include receiving, from a sensor associated with a sensor parameter, first sensor data representing an environment. Examples of a sensor can include, but are not limited to, an image sensor, a microphone, a lidar sensor, a time-of-flight (ToF) sensor, an ultrasonic range sensor, or a radar sensor, and the like.

At operation 404, the process 400 can include receiving second sensor data based at least in part on a modified sensor parameter. Example sensor parameters are discussed above in connection with FIG. 3, for example.

At operation 406, the process 400 can include inputting, as training data, the first sensor data and the second sensor data into a first machine-learned model configured to output an optimized sensor setting.

At operation 408, the process 400 can include inputting the training data into a second machine-learned model configured to output a detected feature in the environment. Examples of a detected feature may include, but are not limited to, a detection of an object, a classification of the object, a location associated with the object, an object size, a pose of the object, a speed of the object, a direction of motion of the object, etc.

At operation 410, the process 400 can include determining whether there are any differences between the detected feature and a known feature. Examples of a difference between the detected feature and the known feature may include one more of a false positive detection of the object, a false negative detection of the object, a misclassification of the object, or an inaccurate detection of location, size, pose, speed, direction of motion of the object, etc.

If there is no difference between the detected feature and the known feature ("NO" at operation 410), the process continues to operation 412 to transmit the first machine-learned model and the second machine-learned model to a vehicle configured to be controlled based on the first machine-learned model and the second machine-learned model. If there are differences between the detected feature and the known feature ("YES" at operation 410), the process continues to operation 414.

At operation 414, the process 400 can include altering a model configuration parameter of a set of model configuration parameters used to at least one of capture and/or process the training data to minimize the differences to obtain a trained first machine-learned model and/or a trained second machine-learned model.

At operation 416, the process 400 can include transmit the trained first machine-learned model and the trained second machine-learned model to a vehicle configured to be controlled based on the trained first machine-leaned model and the trained second machine-learned model.

Figure 5:
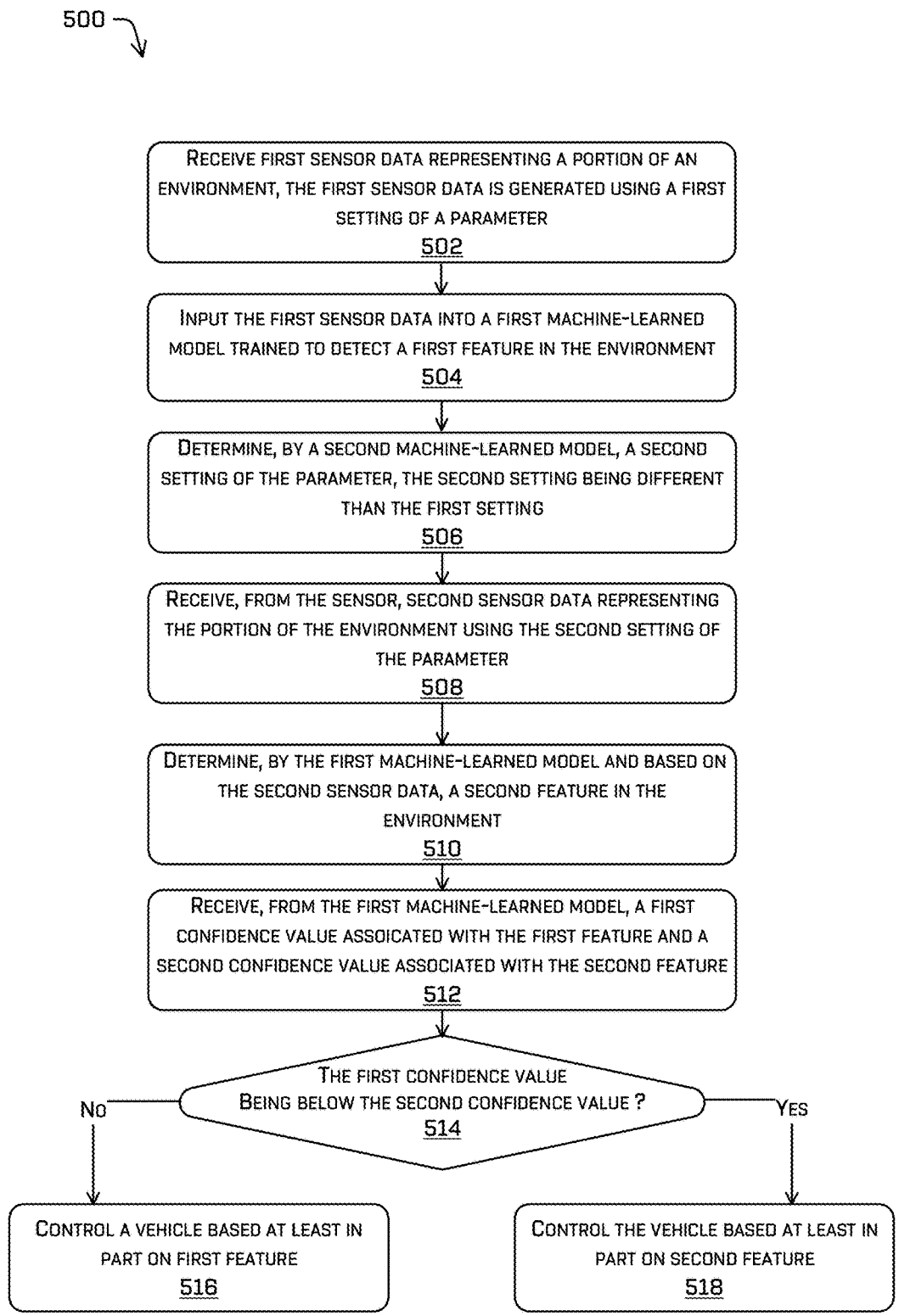
FIG. 5 depicts an example process for determining one or more sensor parameter settings for one or more sensors using a machine-learned model and controlling a vehicle based at least in part on the determined sensor parameter settings for the one or more sensors.

FIG. 5 depicts a process 500 for determining one or more sensor parameter settings for one or more sensors using a machine-learned model and controlling a vehicle based at least in part on the determined sensor parameter settings for the one or more sensors. For example, some or all of the process 500 can be performed by one or more components in the architecture 200, or in the computing system 600, as described below.

At operation 502, the process 500 can include receiving first sensor data representing a portion of an environment. The first sensor data can be generated using a first setting of a parameter associated with a sensor. Example sensors used for generating the first sensor data can include, but are not limited to, a camera, a microphone, a lidar sensor, a time-of-flight (ToF) sensor, an ultrasonic range sensor, or a radar sensor, etc.

At operation 504, the process 500 can include inputting the first sensor data into a first machine-learned model trained to detect a first feature in the environment. In some examples, the first feature is associated with an object in the environment. For example, a first feature detected by the machine-learned model can include, but are not limited to, a detection of the object, a classification of the object, a location associated with the object, a size associated with the object, a pose associated with the object, a speed of the object, or a direction of motion of the object, etc.

At operation 506, the process 500 can include determining, by a second machine-learned model, a second setting of the parameter, where the second setting being different than the first setting.

At operation 508, the process 500 can include receiving, from the sensor, second sensor data representing the portion of the environment using the second setting of the parameter.

At operation 510, the process 500 can include determining, by the first machine-learned model and based on the second sensor data, a second feature in the environment.

At operation 512, the process 500 can include receiving, from the first machine-learned model, a first confidence value associated with the first feature and a second confidence value associated with the second feature.

At operation 514, the process 500 can include determining whether the confidence value is below the second confidence value. If the first confidence value is above the second confidence value ("NO" at operation 514), the process continues to operation 516 to control a vehicle based at least in part on the first feature. If the first confidence value is below a threshold confidence value (YES" at operation 508), the process continues to operation 518 to control the vehicle based at least in part on the second feature.

Figure 6:
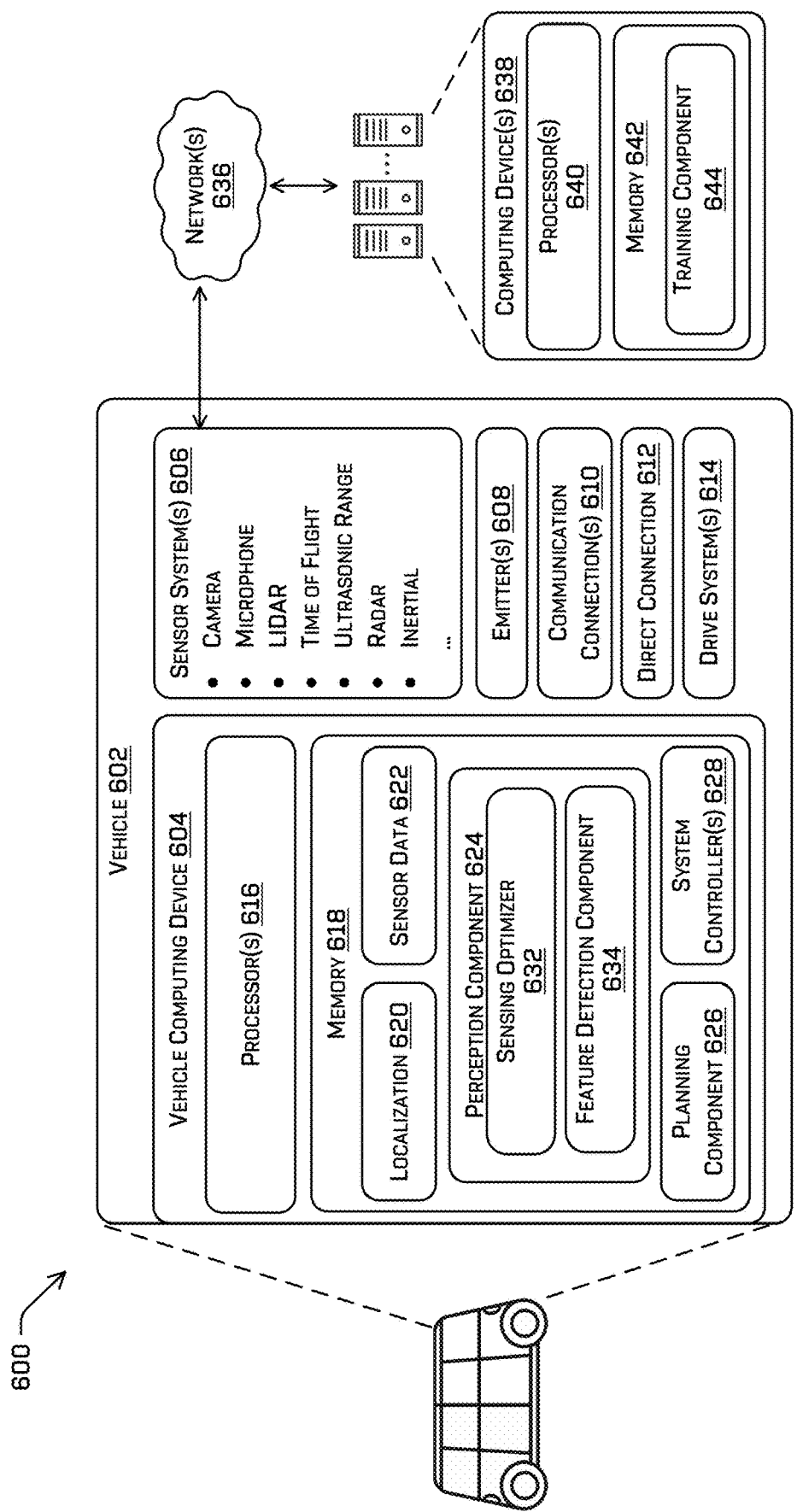
FIG. 6 depicts a block diagram of an example computer system for implementing the techniques described herein.

FIG. 6 is a block diagram illustrating an example system 600 that may be used for performing the techniques described herein. In at least one example, a vehicle 602 can include one or more vehicle computing device(s) 604 (which may correspond with the computing system(s) 218), one or more sensor systems 606, one or more emitters 608, one or more communication connections 610, at least one direct connection 612, and one or more drive systems 614.

In at least one example, a vehicle 602 can be an autonomous vehicle configured to operate according to a Level 6 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 602 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 602 is an autonomous vehicle; however, the vehicle 602 could be any other type of vehicle. While only a single vehicle 602 is illustrated in FIG. 6, in a practical application, the example system 600 can include a plurality of vehicles, which, in some examples, can comprise a fleet of vehicles.

The vehicle computing device(s) 604 can include processor(s) 616 and memory 618 communicatively coupled with the processor(s) 616. In the illustrated example, the memory 618 of the vehicle computing device(s) 604 stores a localization component 620, a sensor data module 622, a perception component 624, a planning component 626, and one or more system controller(s) 628.

In at least one example and as described above, the localization component 620 can determine a pose (position and orientation) of the vehicle 602 in relation to a local and/or global map based at least in part on sensor data received from the sensor component(s) 606 and/or map data associated with a map of an environment in which the vehicle 602 is operating. In at least one example, the localization component 620 can include, or be associated with, a calibration component that is capable of performing operations for calibrating (determining various intrinsic and extrinsic parameters associated with any one or more of the sensor component(s) 606), localizing, and mapping substantially simultaneously.

In at least one example and as described above, the sensor data module 622 (which may correspond with the sensor data component 220) can store sensor data received from sensor system(s) 606. For example, the sensor data module 622 can receive first sensor data from a sensor, first sensor data from a sensor associated with a sensor parameter. Examples of sensor can include a camera sensor, a lidar sensor, and/or additional first sensor data from the sensor system(s) 606 (e.g., sensor data from a microphone, a ToF sensor, an ultrasonic range sensor, a radar sensor, etc.). The sensor data module 622 can further receive second sensor data based at least in part on a modified parameter.

In some examples, the sensor data module 622 may store the first sensor data and the second sensor data as training data and transmit the training data to the perception component 624.

In some examples, the perception component 624 can include a sensing optimizer 632 and a feature detection component 634. In some examples, sensing optimizer 632 can include a first machine-learned model configured to receive the training data from the sensor data component 622 and output an optimized sensor setting associated with the sensor parameter. The feature detection component 634 can include a second machine-learned model configured to receive the training data from the sensor data component 622 and output one or more detected feature(s) in the environment.

In some examples, the feature detection component 634 can determine, based on the training data, one or more detected feature(s) associated with an object. In some examples, the detected feature(s) associated with the object can include, but are not limited to, a detection of the object, a classification of the object, a location associated with the object, an object size, a pose of the object, a speed of the object, a direction of motion of the object, etc.

In some examples, the feature detection component 634 can determine one or more difference(s) between the detected feature(s) of the object and the known feature(s) of the object. For example, the difference(s) between the detected feature(s) of the object and the known feature(s) of the object can include one more of a false positive detection of the object, a false negative detection of the object, a misclassification of the object, or an inaccurate detection of location, size, pose, speed, or direction of motion of the object, etc.

The sensing optimizer 632 can receive the detected feature(s) from the feature detection component 634 and alter a model configuration parameter of a set of model configuration parameters used to capture or process the training data to minimize the difference(s) to obtain a trained first machine-learned model and/or a trained second machine-learned model. In some examples, the set of model configuration parameters can include model configuration parameters associated with capturing the first sensor data (e.g., model configuration parameters associated with sensor settings 210 or sensor settings 214) and/or model configuration parameters associated with a signal processing algorithm used to process raw data to generate the first sensor data (e.g., model configuration parameters associated with SP settings 212 or SP settings 216). In some examples, the sensing optimizer 632 can be a stand-alone component. Alternatively, the sensing optimizer 632 can be integrated with the feature detection component 634.

In some examples, the trained first machine-learned model (e.g., the sensing optimizer 632) can output an optimized sensor setting for capturing and/or processing the sensor data. In some examples, outputting an optimized sensor setting for capturing and/or processing the sensor data include altering one or more of a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, a vignetting correction setting, etc. Additional modifications to one or more sensor settings associated with other types of sensors are discussed below in connection with FIG. 3, for example.

In some examples, optimizing the sensor setting for capturing and/or processing the sensor data is based at least in part on determining a first feature in the environment. For example, the optimized sensor setting can be determined based on an occurrence of an event or condition (e.g., detection of a particular type of object, a particular lighting condition, a presence of obstructions, etc.). In some instances, the sensing optimizer 632 can determine a first feature (e.g., one or more feature(s) 228) represented in a first sensor data (e.g., image data obtained from the camera sensor(s) 204) and a confidence value associated with the first feature. The sensing optimizer 632 can further determine a second setting of the parameter based at least in part on the first confidence value is below a threshold confidence value.

In some examples, the optimized sensor setting is based at least in part on a time at which the sensor data was captured. For example, the optimized sensor setting can be updated periodically during vehicle operation, such as updating the optimized sensor setting one time per minute, five times per minute, ten times per minute, etc. In some examples, the optimized sensor setting can be updated at certain times of a day. Furthermore, in some examples, the optimized sensor setting can be set back to default one cycle out of a pre-defined number of cycles, such as updating the setting of the parameter back to a default setting one cycle out of every ten cycles, every fifty cycles, every hundred cycles, etc. By updating the optimized sensor setting periodically over time, the techniques described herein can prevent or account for the sensing optimizer 632 to optimize the optimized sensor setting around an optimal local setting (e.g., a local maxima or local minima).

The planning component 626 can receive the determined first feature and/or the second feature in the environment from the perception component 624 and determine a path for an autonomous vehicle to follow to traverse through an environment. For example, the first feature and/or the second feature can be associated with an object, and the planning component 626 can determine a route to travel from a first location (e.g., a current location) to a second location (e.g., a target location) to avoid the object in the environment.

In some examples, the planning component 626 can receive data, information, and/or outputs from the localization component 620, the sensor data module 622, the perception component 624, as well as map data, and may generate one or more proposed vehicle operations (e.g., proposed trajectories). Additional details of localization components, perception components, prediction components, and/or planning components that are usable can be found in U.S. Pat. No. 9,612,123, issued on Apr. 4, 2017, and U.S. Pat. No. 10,363,390, issued on Jul. 16, 2019, the entire contents of both of which are incorporated by reference herein in their entirety and for all purposes. In some examples (e.g., where the vehicle 602 is not an autonomous vehicle), one or more of the aforementioned components can be omitted from the vehicle 602.

In at least one example, the vehicle computing device(s) 604 can include one or more system controller(s) 628, which can be configured to control steering, propulsion, braking, safety, emitters, communication, and other systems of the vehicle 602. These system controller(s) 628 can communicate with and/or control corresponding systems of the drive system(s) 614 and/or other systems of the vehicle 602.

While the components described above are illustrated as "onboard" the vehicle 602, in other implementations, the components can be remotely located and/or accessible to the vehicle 602. For instance, the component can be remotely located on the computing device(s) 638 and accessible to the vehicle 602 via one or more network(s) 636. Furthermore, while the components are described above as "components," such components can comprise one or more components and/or modules, which can be part of a system, for performing operations attributed to each of the components.

In at least one example, the localization component 620, the sensor data module 622, the perception component 624, and the planning component 626 can process data, as described above, and can send their respective outputs over the network(s) 636, to computing device(s) 638. In at least one example, the localization component 620, the perception component 622, the perception component 624, and the planning component 626 can send their respective outputs to the computing device(s) 638 at a particular frequency, after a lapse of a predetermined period of time, in near real-time, etc.

In at least one example, the sensor component(s) 606 can include cameras (e.g., RGB, IR, intensity, depth, etc.), microphones, lidar sensors, ToF sensors, ultrasonic range sensors, radar sensors, inertial sensors (e.g., inertial measurement units, accelerometers, magnetometers, gyroscopes, etc.), environment sensors (e.g., temperature sensors, humidity sensors, light sensors, pressure sensors, etc.), sonar sensors, location sensors (e.g., GPS, compass, etc.), wheel encoders, audio sensors, etc. The sensor component(s) 606 can provide input to the vehicle computing device(s) 604. In some examples, the sensor component(s) 606 can preprocess at least some of the sensor data prior to sending the sensor data to the vehicle computing device(s) 604. In at least one example, the sensor component(s) 606 can send sensor data, via the network(s) 636, to the computing device(s) 638 at a particular frequency, after a lapse of a predetermined period of time, in near real-time, etc.

The vehicle 602 can also include one or more emitters 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), or the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 608 can be positioned at various locations about the exterior and/or interior of the vehicle 602.

The vehicle 602 can also include communication connection(s) 610 that enable communication between the vehicle 602 and other local or remote computing device(s), such as the computing device(s) 638, as well as other remote or local computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperation computing device or other remote services.

The communications connection(s) 610 can include physical and/or logical interfaces for connecting the vehicle computing device(s) 604 to another computing device or a network, such as network(s) 636. For example, the communications connection(s) 610 can enable Wi-Fi-based communication such as via frequencies defined by the IEEE 602.11 standards, short range wireless frequencies such as BLUETOOTH©, or any suitable wired or wireless communications protocol that enables the respective computing device to interface with the other computing device(s).

The direct connection(s) 612 can directly connect the drive system(s) 614 and other systems of the vehicle 602. In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include sensor component(s) to detect conditions of the drive system(s) 614 and/or the surroundings of the vehicle 602. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 614. In some cases, the sensor component(s) on the drive system(s) 614 can overlap or supplement corresponding systems of the vehicle 602 (e.g., sensor component(s) 606).

The drive system(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 614. Furthermore, the drive system(s) 614 also include communication connection(s) that enable communication by the respective drive system with other local or remote computing device(s).

In FIG. 6, the vehicle computing device(s) 604, sensor component(s) 606, emitter(s) 608, and the communication connection(s) 610 are shown onboard the vehicle 602. However, in some examples, the vehicle computing device(s) 604, sensor component(s) 606, emitter(s) 608, and the communication connection(s) 610 can be implemented outside of an actual vehicle (i.e., not onboard the vehicle 602).

As described above, the vehicle 602 can send data to the computing device(s) 638, via the network(s) 636. In some examples, the vehicle 602 can send raw sensor data to the computing device(s) 638. In other examples, the vehicle 602 can send processed sensor data and/or representations of sensor data to the computing device(s) 638 (e.g., data output from the localization component 620, the perception component 622, the perception component 624, the planning component 626, the sensing optimizer 632, etc.). In some examples, the vehicle 602 can send data to the computing device(s) 638 at a particular frequency, after a lapse of a predetermined period of time, in near real-time, etc.

The computing device(s) 638 can receive the data (raw or processed) from the vehicle 602 and/or other data collection devices, as well as data from one or more third party sources and/or systems. In at least one example, the computing device(s) 638 can include processor(s) 640 and memory 642 communicatively coupled with the processor(s) 630. In the illustrated example, the memory 642 of the computing device(s) 638 stores a training component 644. The training component 644 includes functionality for training one or more machine-learned model(s), which may correspond with the sensing optimizer 226.

The processor(s) 616 of the vehicle 602 and the processor(s) 640 of the computing device(s) 638 can be any suitable processor capable of executing instructions to process data and perform operations as described herein. By way of example and not limitation, the processor(s) 616 and 640 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 642 are examples of non-transitory computer-readable media. Memory 618 and 642 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in some examples, components of the vehicle 602 can be associated with the computing device(s) 638 and/or the components of the computing device(s) 638 can be associated with the vehicle 602. That is, the vehicle 602 can perform one or more of the functions associated with the computing device(s) 638, and vice versa.

Furthermore, while the vehicle computing device(s) 604 and the computing device(s) 638 are shown to include multiple components, in some examples, such components can be associated with more or fewer individual components. For example, the localization component 620, the sensor data module 622, the perception component 624, and/or the planning component 626 can be combined into a single component. That is, while depicted as separate components, any one or more of the components can be combined.

Example Clauses

The following paragraphs describe various examples. Any of the examples in this section may be used with any other of the examples in this section and/or any of the other examples or embodiments described herein.

A. A system comprising: one or more processors; and non-transitory computer-readable media storing instructions that when executed by the one or more processors, cause the system to perform operations comprising: receiving, from a sensor associated with a sensor parameter, first sensor data representing an environment; modifying, as a modified sensor parameter, the sensor parameter; one or more of determining or receiving second sensor data based at least in part on the modified sensor parameter; inputting, as training data, the first sensor data and the second sensor data into a first machine-learned model configured to output an optimized sensor setting associated with the sensor parameter; inputting the training data into a second machine-learned model configured to output a detected feature in the environment; determining a difference between the detected feature and a known feature of the environment; altering, as an altered model configuration parameter, a model configuration parameter of a set of model configuration parameters used to capture or process the training data to minimize the difference to obtain a trained first machine-learned model or a trained second machine-learned model; and transmitting the trained first machine-learned model and the trained second machine-learned model to a vehicle configured to be controlled based at least in part on the trained first machine-learned model and the trained second machine-learned model.

B. The system as paragraph A recites, wherein the sensor parameter comprises a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, or a vignetting correction setting.

C. The system as paragraph A or B recites, wherein receiving the first sensor data comprises: receiving raw sensor data from the sensor; and modifying, as the first sensor data, the raw sensor data in accordance with a signal processing setting, and wherein the one or more of determining or receiving the second sensor data comprises: modifying, as the second sensor data, the raw sensor data in accordance with a modified signal processing setting.

D. The system as any of paragraphs A-C recite, wherein the detected feature comprises a detection of an object, a classification of the object, a location associated with the object, an object size, a pose of the object, or a speed of the object.

E. The system as any of paragraphs A-D recite, wherein the difference between the detected feature and the known feature comprises one more of a false positive detection of an object, a false negative detection of the object, a misclassification of the object, or an inaccurate detection of one or more of location, size, pose, or speed of the object.

F. One or more non-transitory computer-readable media storing instructions executable by one or more processors, wherein the instructions, when executed, cause the one or more processors to perform operations comprising: receiving, from a sensor associated with a sensor parameter, first sensor data representing an environment; modifying, as a modified sensor parameter, the sensor parameter; one or more of determining or receiving second sensor data based at least in part on the modified sensor parameter; inputting, as training data, the first sensor data and the second sensor data into a first machine-learned model configured to output an optimized sensor setting associated with the sensor parameter; inputting the training data into a second machine-learned model configured to output a detected feature in the environment; determining a difference between the detected feature and a known feature of the environment; altering, as an altered model configuration parameter, a model configuration parameter of a set of model configuration parameters used to capture or process the training data to minimize the difference to obtain a trained first machine-learned model or a trained second machine-learned model; and transmitting the trained first machine-learned model and the trained second machine-learned model to a vehicle configured to be controlled based at least in part on the trained first machine-learned model and the trained second machine-learned model.

G. The one or more non-transitory computer-readable media as paragraph F recites, wherein the sensor parameter comprises a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, or a vignetting correction setting.

H. The one or more non-transitory computer-readable media paragraph F or G recites, wherein the sensor parameter comprises a microphone gain setting or a directionality setting.

I. The one or more non-transitory computer-readable media as any of paragraphs F-H recite, wherein the sensor parameter comprises a spin rate setting, a spin direction setting, a lidar pulse mode setting, or a lidar pulse intensity setting.

J. The one or more non-transitory computer-readable media as any of paragraphs F-I recite, wherein the sensor parameter comprises a ToF gain setting, a ToF saturation time setting, a ToF pixel binning setting, a modulation frequency setting, or an emitter intensity setting.

K. The one or more non-transitory computer-readable media as any of paragraphs F-J recite, wherein the sensor parameter comprises a frequency setting, a pulse mode setting, or a pulse intensity setting.

L. The one or more non-transitory computer-readable media as any of paragraphs F-K recite, wherein the sensor parameter comprises a radar frequency setting, a cycle timing setting, a chirp slope setting, a range mode setting, or a sensing threshold setting.

M. The one or more non-transitory computer-readable media as any of paragraphs F-L recite, receiving raw sensor data from the sensor; and modifying, as the first sensor data, the raw sensor data in accordance with a signal processing setting, and wherein the one or more of determining or receiving the second sensor data comprises: modifying, as the second sensor data, the raw sensor data in accordance with the signal processing setting.

N. The one or more non-transitory computer-readable media as any of paragraphs F-M recite, wherein the detected feature comprises a detection of an object, a classification of the object, a location associated with the object, an object size, a pose of the object, or a speed of the object.

O. The one or more non-transitory computer-readable media as any of paragraphs F-N recite, wherein the difference between the detected feature and the known feature comprises one more of a false positive detection of an object, a false negative detection of the object, a misclassification of the object, or an inaccurate detection of one or more of location, size, pose, or speed of the object.

P. A method comprising: receiving, from a sensor associated with a sensor parameter, first sensor data representing an environment; modifying, as a modified sensor parameter, the sensor parameter; one or more of determining or receiving second sensor data based at least in part on the modified sensor parameter; inputting, as training data, the first sensor data and the second sensor data into a first machine-learned model configured to output an optimized sensor setting associated with the sensor parameter; inputting the training data into a second machine-learned model configured to output a detected feature in the environment; determining a difference between the detected feature and a known feature of the environment; altering, as an altered model configuration parameter, a model configuration parameter of a set of model configuration parameters used to capture or process the training data to minimize the difference to obtain a trained first machine-learned model or a trained second machine-learned model; and transmitting the trained first machine-learned model and the trained second machine-learned model to a vehicle configured to be controlled based at least in part on the trained first machine-learned model and the trained second machine-learned model.

Q. The method as paragraph P recites, wherein the sensor parameter comprises a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, or a vignetting correction setting.

R. The method as paragraph P or Q recites, wherein receiving the first sensor data comprises: receiving raw sensor data from the sensor; and modifying, as the first sensor data, the raw sensor data in accordance with a signal processing setting, and wherein the one or more of determining or receiving the second sensor data comprises: modifying, as the second sensor data, the raw sensor data in accordance with the signal processing setting.

S. The method as any of paragraphs P-R recite, wherein the detected feature comprises a detection of an object, a classification of the object, a location associated with the object, an object size, a pose of the object, or a speed of the object.

T. The method as any of paragraphs P-S recite, wherein the difference between the detected feature and the known feature comprises one more of a false positive detection of an object, a false negative detection of the object, a misclassification of the object, or an inaccurate detection of one or more of location, size, pose, or speed of the object.

U. A system comprising: one or more processors; and one or more computer readable storage media communicatively coupled to the one or more processors and storing instructions that are executable by the one or more processors to: receiving, from a sensor associated with a vehicle, first sensor data representing a portion of an environment, wherein the first sensor data is generated using a first setting of a parameter; inputting the first sensor data to a first machine-learned model trained to detect a first feature in the environment; determining, by a second machine-learned model, a second setting of the parameter, the second setting being different than the first setting; outputting the second setting of the parameter for use in generating sensor data; receiving, from the sensor, second sensor data representing the portion of the environment generated using the second setting of the parameter; inputting the second sensor data into the first machine-learned model; determining, by the first machine-learned model, a second feature in the environment; and control the vehicle based at least in part on the second feature.

V. The system as paragraph U recites, wherein: the first feature is associated with a first confidence value; and the second feature is associated with a second confidence value greater than or equal to the first confidence value.

W. The system as paragraph U or V recites, wherein one or more of the first feature or the second feature is associated with an object, the first feature comprising at least one of: a detection of the object; a classification of the object; a location associated with the object; a size associated with the object; a pose associated with the object; a speed of the object; or a direction of motion of the object.

X. The system as any of paragraphs U-W recite, wherein the first sensor data or the second sensor data comprises data captured by at least one of a camera, a microphone, a lidar sensor, a time-of-flight (ToF) sensor, an ultrasonic range sensor, or a radar sensor.

Y. The system as any of paragraphs U-X recite, wherein the parameter comprises a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, or a vignetting correction setting.

Z. A method comprising: receiving, from a sensor associated with a vehicle, first sensor data representing a portion of an environment, wherein the first sensor data is generated using a first setting of a parameter; inputting the first sensor data to a first machine-learned model trained to detect a first feature in the environment; determining, by a second machine-learned model, a second setting of the parameter, the second setting being different than the first setting;

outputting the second setting of the parameter for use in generating sensor data; receiving, from the sensor, second sensor data representing the portion of the environment generated using the second setting of the parameter; inputting the second sensor data into the first machine-learned model; determining, by the first machine-learned model, a second feature in the environment; and controlling the vehicle based at least in part on the second feature.

AA. The method as recited in paragraph Z, wherein the first feature is associated with a first confidence value; and the second feature is associated with a second confidence value greater than or equal to the first confidence value.

BB. The method as paragraph Z or AA recites, wherein one or more of the first or second feature is associated with an object, the first feature comprising at least one of: a detection of the object; a classification of the object; a location associated with the object; a size associated with the object; a pose associated with the object; a speed of the object; or a direction of motion of the object.

CC. The method as any of paragraphs Z-BB recite, wherein the first sensor data or the second sensor data comprises data captured by at least one of a camera, a microphone, a lidar sensor, a time-of-flight (ToF) sensor, an ultrasonic range sensor, or a radar sensor.

DD. The method as any of paragraphs Z-CC recite, wherein the parameter comprises a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, or a vignetting correction setting.

EE. The method as any of paragraphs Z-DD recite, wherein the parameter comprises, wherein the parameter comprises a microphone gain setting or a directionality setting.

FF. The method as any of paragraphs Z-EE recite, wherein the parameter comprises a spin rate setting, a spin direction setting, a lidar pulse mode setting, or a lidar pulse intensity setting.

GG. The method as any of paragraphs Z-FF recite, wherein the parameter comprises a ToF gain setting, a ToF saturation time setting, a ToF pixel binning setting, a modulation frequency setting, or an emitter intensity setting.

HH. The method as any of paragraphs Z-GG recite, wherein the parameter comprises a frequency setting, a pulse mode setting, or a pulse intensity setting.

II. The method as any of paragraphs Z-HH recite, wherein the parameter comprises a radar frequency setting, a cycle timing setting, a chirp slope setting, a range mode setting, or a sensing threshold setting.

JJ. One or more non-transitory computer-readable media storing instructions executable by one or more processors, wherein the instructions, when executed, cause the one or more processors to perform operations comprising: receiving, from a sensor associated with a vehicle, first sensor data representing a portion of an environment, wherein the first sensor data is generated using a first setting of a parameter; inputting the first sensor data to a first machine-learned model trained to detect a first feature in the environment; determining, by a second machine-learned model, a second setting of the parameter, the second setting being different than the first setting; outputting the second setting of the parameter for use in generating sensor data; receiving, from the sensor, second sensor data representing the portion of the environment generated using the second setting of the parameter; inputting the second sensor data into the first machine-learned model; determining, by the first machine-learned model, a second feature in the environment; and controlling the vehicle based at least in part on the second feature.

KK. The one or more non-transitory computer-readable media as paragraph JJ recites, wherein: the first feature is associated with a first confidence value; and the second setting of the parameter is based at least in part on the first confidence value being below a threshold confidence value.

LL. The one or more non-transitory computer-readable media as paragraph JJ or KK recites, wherein one or more of the first feature or the second feature is associated with an object, the first feature comprising at least one of: a detection of the object; a classification of the object; a location associated with the object; a size associated with the object; a pose associated with the object; a speed of the object; or a direction of motion of the object.

MM. The one or more non-transitory computer-readable media as any of paragraphs JJ-LL recite, wherein the first sensor data or the second sensor data comprises data captured by at least one of a camera, a microphone, a lidar sensor, a time-of-flight (ToF) sensor, an ultrasonic range sensor, or a radar sensor.

NN. The one or more non-transitory computer-readable media as any of paragraphs JJ-MM recite, wherein the parameter comprises one or more of a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, or a vignetting correction setting.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
non-transitory computer-readable media storing instructions that when executed by the one or more processors, cause the system to perform operations comprising:
receiving, from a sensor associated with a sensor parameter, first sensor data representing an environment;
modifying, as a modified sensor parameter, the sensor parameter;
one or more of determining or receiving second sensor data based at least in part on the modified sensor parameter;
inputting, as training data, the first sensor data and the second sensor data into a first machine-learned model configured to output an optimized sensor setting associated with the sensor parameter;
inputting the training data into a second machine-learned model configured to output a detected feature in the environment;
determining a difference between the detected feature and a known feature of the environment;
altering, as an altered model configuration parameter, a model configuration parameter of a set of model configuration parameters used to capture the training data to minimize the difference to obtain a trained first machine-learned model or a trained second machine-learned model; and
transmitting the trained first machine-learned model and the trained second machine-learned model to a vehicle configured to be controlled based at least in part on the trained first machine-learned model and the trained second machine-learned model.

2. The system of claim 1, wherein the sensor parameter comprises a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, or a vignetting correction setting.

3. The system of claim 1, wherein receiving the first sensor data comprises:
receiving raw sensor data from the sensor; and
modifying, as the first sensor data, the raw sensor data in accordance with a signal processing setting, and
wherein the one or more of determining or receiving the second sensor data comprises:
modifying, as the second sensor data, the raw sensor data in accordance with a modified signal processing setting.

4. The system of claim 1, wherein the detected feature comprises a detection of an object, a classification of the object, a location associated with the object, an object size, a pose of the object, or a speed of the object.

5. The system of claim 1, wherein the difference between the detected feature and the known feature comprises one more of a false positive detection of an object, a false negative detection of the object, a misclassification of the object, or an inaccurate detection of one or more of location, size, pose, or speed of the object.

6. One or more non-transitory computer-readable media storing instructions executable by one or more processors, wherein the instructions, when executed, cause the one or more processors to perform operations comprising:
receiving, from a sensor associated with a sensor parameter, first sensor data representing an environment;
modifying, as a modified sensor parameter, the sensor parameter;
one or more of determining or receiving second sensor data based at least in part on the modified sensor parameter;
inputting, as training data, the first sensor data and the second sensor data into a first machine-learned model configured to output an optimized sensor setting associated with the sensor parameter;
inputting the training data into a second machine-learned model configured to output a detected feature in the environment;
determining a difference between the detected feature and a known feature of the environment;
altering, as an altered model configuration parameter, a model configuration parameter of a set of model configuration parameters used to capture the training data to minimize the difference to obtain a trained first machine-learned model or a trained second machine-learned model; and
transmitting the trained first machine-learned model and the trained second machine-learned model to a vehicle configured to be controlled based at least in part on the trained first machine-learned model and the trained second machine-learned model.

7. The one or more non-transitory computer-readable media of claim 6, wherein the sensor parameter comprises a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, or a vignetting correction setting.

8. The one or more non-transitory computer-readable media of claim 6, wherein the sensor parameter comprises a microphone gain setting or a directionality setting.

9. The one or more non-transitory computer-readable media of claim 6, wherein the sensor parameter comprises a spin rate setting, a spin direction setting, a lidar pulse mode setting, or a lidar pulse intensity setting.

10. The one or more non-transitory computer-readable media of claim 6, wherein the sensor parameter comprises a ToF gain setting, a ToF saturation time setting, a ToF pixel binning setting, a modulation frequency setting, or an emitter intensity setting.

11. The one or more non-transitory computer-readable media of claim 6, wherein the sensor parameter comprises a frequency setting, a pulse mode setting, or a pulse intensity setting.

12. The one or more non-transitory computer-readable media of claim 6, wherein the sensor parameter comprises a radar frequency setting, a cycle timing setting, a chirp slope setting, a range mode setting, or a sensing threshold setting.

13. The one or more non-transitory computer-readable media of claim 6, receiving raw sensor data from the sensor; and
modifying, as the first sensor data, the raw sensor data in accordance with a signal processing setting, and wherein the one or more of determining or receiving the second sensor data comprises:
modifying, as the second sensor data, the raw sensor data in accordance with the signal processing setting.

14. The one or more non-transitory computer-readable media of claim 6, wherein the detected feature comprises a detection of an object, a classification of the object, a location associated with the object, an object size, a pose of the object, or a speed of the object.

15. The one or more non-transitory computer-readable media of claim 6, wherein the difference between the detected feature and the known feature comprises one more of a false positive detection of an object, a false negative detection of the object, a misclassification of the object, or an inaccurate detection of one or more of location, size, pose, or speed of the object.

16. A method comprising:
receiving, from a sensor associated with a sensor parameter, first sensor data representing an environment;
modifying, as a modified sensor parameter, the sensor parameter;
one or more of determining or receiving second sensor data based at least in part on the modified sensor parameter;
inputting, as training data, the first sensor data and the second sensor data into a first machine-learned model configured to output an optimized sensor setting associated with the sensor parameter;
inputting the training data into a second machine-learned model configured to output a detected feature in the environment;
determining a difference between the detected feature and a known feature of the environment;
altering, as an altered model configuration parameter, a model configuration parameter of a set of model configuration parameters used to capture the training data to minimize the difference to obtain a trained first machine-learned model or a trained second machine-learned model; and
transmitting the trained first machine-learned model and the trained second machine-learned model to a vehicle configured to be controlled based at least in part on the trained first machine-learned model and the trained second machine-learned model.

17. The method of claim 16, wherein the sensor parameter comprises a camera gain setting, an exposure setting, a gamma setting, a brightness setting, a contrast setting, a white balance setting, a hue setting, a camera saturation setting, a high-dynamic range setting, a denoising setting, a sharpening setting, a camera pixel binning setting, a bit depth setting, an area of interest setting, a video rate setting, a color format setting, a debayering mode setting, a distortion correction setting, or a vignetting correction setting.

18. The method of claim 16, wherein receiving the first sensor data comprises:
receiving raw sensor data from the sensor, and
modifying, as the first sensor data, the raw sensor data in accordance with a signal processing setting, and
wherein the one or more of determining or receiving the second sensor data comprises:
modifying, as the second sensor data, the raw sensor data in accordance with the signal processing setting.

19. The method of claim 16, wherein the detected feature comprises a detection of an object, a classification of the object, a location associated with the object, an object size, a pose of the object, or a speed of the object.

20. The method of claim 16, wherein the difference between the detected feature and the known feature comprises one more of a false positive detection of an object, a false negative detection of the object, a misclassification of the object, or an inaccurate detection of one or more of location, size, pose, or speed of the object.

* * * * *